US012494595B2

(12) United States Patent
Miedl et al.

(10) Patent No.: US 12,494,595 B2
(45) Date of Patent: Dec. 9, 2025

(54) INNER-CONDUCTOR CONTACT ELEMENT FOR AN ANGLED CONNECTOR, AND ASSOCIATED PRODUCTION METHOD

(71) Applicant: ROSENBERGER HOCHFREQUENZTECHNIK GMBH & CO. KG, Fridolfing (DE)

(72) Inventors: Thomas Miedl, Garching (DE); Till Bredbeck, Siegsdorf (DE); Martin Zebhauser, Laufen (DE); Marcel Volkmar, Breitungen (DE)

(73) Assignee: Rosenberger Hochfrequenztechnik GmbH & Co. KG, Fridolfing (DE)

( * ) Notice: Subject to any disclaimer, the term of this patent is extended or adjusted under 35 U.S.C. 154(b) by 286 days.

(21) Appl. No.: 18/276,748

(22) PCT Filed: Feb. 16, 2022

(86) PCT No.: PCT/EP2022/053831
§ 371 (c)(1),
(2) Date: Aug. 10, 2023

(87) PCT Pub. No.: WO2022/175334
PCT Pub. Date: Aug. 25, 2022

(65) Prior Publication Data

US 2024/0145950 A1 May 2, 2024

(30) Foreign Application Priority Data

Feb. 17, 2021 (DE) ..................... 10 2021 103 687.9

(51) Int. Cl.
*H01R 9/05* (2006.01)
*H01R 4/18* (2006.01)
(Continued)

(52) U.S. Cl.
CPC ............... *H01R 9/05* (2013.01); *H01R 4/184* (2013.01); *H01R 4/20* (2013.01); *H01R 24/44* (2013.01);
(Continued)

(58) Field of Classification Search
CPC . H01R 9/05; H01R 4/184; H01R 4/20; H01R 24/44; H01R 43/16; H01R 4/183; H01R 4/203; H01R 4/206; H01R 9/03
See application file for complete search history.

(56) References Cited

U.S. PATENT DOCUMENTS

2004/0058582 A1* 3/2004 Wendling ............. H01R 9/0518 439/582

FOREIGN PATENT DOCUMENTS

| | | |
|---|---|---|
| DE | 10331034 | 3/2004 |
| DE | 202008014409 U1 | 1/2009 |

(Continued)

OTHER PUBLICATIONS

International Search Report and Written Opinion issued in App. No. PCT/EP2022/053831, mailing date Jun. 21, 2022, 14 pages.

(Continued)

*Primary Examiner* — Justin M Kratt
(74) *Attorney, Agent, or Firm* — Koffsky Schwalb LLC

(57) ABSTRACT

An inner-conductor contact element for an angled connector has a crimp region which is designed to be connectable to an inner conductor of a cable, and an interface region which is designed to be connectable to an inner-conductor contact element of a counterpart connector corresponding to the angled connector. The inner-conductor contact element also has a connection region which connects the crimp region to the interface region. The inner-conductor contact element is formed in one piece. The connection region has a first transverse extent and a second transverse extent which is
(Continued)

Figure 1A:
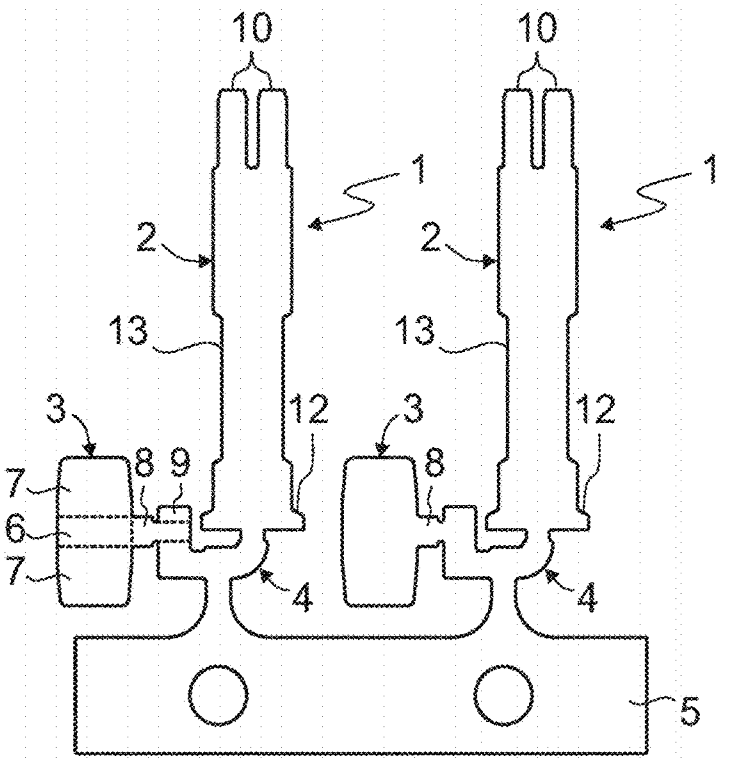

smaller, preferably many times smaller, than the first transverse extent. The connection region has an angular shape in a plane formed by the first transverse extent and a longitudinal extent of the connection region.

14 Claims, 6 Drawing Sheets

(51) Int. Cl.

| | |
|---|---|
| ***H01R 4/20*** | (2006.01) |
| ***H01R 24/44*** | (2011.01) |
| ***H01R 43/16*** | (2006.01) |
| *H01R 9/03* | (2006.01) |

(52) U.S. Cl.

CPC ............. *H01R 43/16* (2013.01); *H01R 4/183* (2013.01); *H01R 4/203* (2013.01); *H01R 4/206* (2013.01); *H01R 9/03* (2013.01)

(56) References Cited

FOREIGN PATENT DOCUMENTS

| | | | |
|---|---|---|---|
| EP | 1241734 | A2 | 9/2002 |
| EP | 1592098 | A2 | 11/2005 |
| EP | 3379659 | A1 | 9/2018 |
| TW | 202038516 | | 10/2020 |

OTHER PUBLICATIONS

EPO Communication under Rule 71 (3) (inlcudes “Intention to grant”) in App. No. EP22710956.8, dated Jul. 16, 2025, 68 pages.

* cited by examiner

INNER-CONDUCTOR CONTACT ELEMENT FOR AN ANGLED CONNECTOR, AND ASSOCIATED PRODUCTION METHOD

The present application claims the priority of German patent application no. 10 2021 103 687.9, the content of which is fully incorporated herein by reference.

FIELD OF THE INVENTION

The present invention relates to an inner-conductor contact element for an angled connector and to a method for producing an inner-conductor contact element.

TECHNICAL BACKGROUND

With the aid of an electrical plug-in connection, transmission of data signals and supply voltages between different electrical units, such as an electrical cable, a printed circuit board with electronic components, or a housing with electrical modules, can be enabled and then separated again. An electrical connector and an associated electrical counterpart connector can therefore be a plug, a printed circuit board plug, a built-in plug, a socket, a coupling or an adapter. The term "connector" or "counterpart connector" used in the context of the invention is representative of all variants.

The technical requirements for electrical plug-in connections, especially for the automotive industry and for vehicles, are considerable:

Such a plug-in connection has to withstand high mechanical loads, for example has to remain closed during the entire operation in a defined manner, and has to maintain reliable electrical contact. On account of the high volume of data that is communicated between the individual electronic devices in the vehicle, an electrical plug-in connection must be able to meet the further technical challenge of managing data transmission with a high transmission bandwidth. In addition, the installation space and the weight of the connector must be kept low. Finally, the connector has to be economical to manufacture in large numbers and easy to assemble.

DE 20 2008 014 409 U1 discloses an angled connector for transmitting a high-frequency electrical signal. The angled connector of DE 20 2008 014 409 U1 has two inner-conductor contact elements for contacting the inner conductor of the high-frequency cable and the inner conductor of the associated counterpart connector. These inner-conductor contact elements are electrically and mechanically connected to each other within the angled connector.

Assembling a two-part inner-conductor contact element within an angled connector is comparatively complicated and therefore needs improvement.

SUMMARY OF THE INVENTION

Against this background, the object of the present invention is to make available an inner-conductor contact element for an angled connector, with which simple and straightforward assembly of an angled connector is possible.

According to the invention, this object is achieved by an inner-conductor contact element for an angled connector having the features disclosed herein.

The following is accordingly provided:

An inner-conductor contact element for an angled connector, having a crimp region which is designed to be connectable to an inner conductor of a cable, an interface region which is designed to be connectable to an inner-conductor contact element of a counterpart connector corresponding to the angled connector, and a connection region which connects the crimp region to the interface region, wherein the inner-conductor contact element is formed in one piece, wherein the connection region has a first transverse extent and a second transverse extent which is smaller, preferably many times smaller, than the first transverse extent, wherein the connection region has an angular shape in a plane formed by the first transverse extent and a longitudinal extent of the connection region.

The finding/concept on which the present invention is based is to design a one-piece inner-conductor contact element for an angled connector. For this purpose, the inner-conductor contact element has three regions that are connected to one another in one piece. A mechanical and electrical connection to the inner conductor of a coaxial cable is possible in a crimp region of the inner-conductor contact element, while an interface region of the inner-conductor contact element is connectable to the inner conductor of a coaxial counterpart connector. The crimp region is connected to the interface region via a connection region of the inner-conductor contact element, which is formed with an angular shape. Here and in the following, an angular connection region is to be understood as meaning a connection region which comprises two elongate partial regions which each have a common end and are thus connected to each other via the common end. The two elongate partial regions are oriented at an angle to each other with respect to their longitudinal extent relative to the common end. The angle is greater than 0° and less than 180°, preferably greater than 45° and less than 135°, particularly preferably greater than 85° and less than 95°, and best 90°.

On account of the angular shape of the connection region, the crimp region is oriented at an angle to the interface region, and a one-piece implementation of an inner-conductor contact element for an angled connector is therefore advantageously possible.

The crimp region of the inner-conductor contact element enables a crimp connection to be formed between the inner-conductor contact element of the angled connector and an inner conductor of a cable, preferably a coaxial cable. A crimp connection is a non-re-leasable electrical connection between at least one inner conductor, preferably a single inner conductor, and a crimp region designed as a crimp contact. The crimp contact, which is preferably embodied as a crimp sleeve, can have different crimp cross-sectional profiles, for example a circular profile in what is called a round crimp, a B-shaped profile in what is called a B-crimp, an elliptical profile, etc. By adapting the cross-sectional geometry of the crimp sleeve as best as possible to the cross section of the inner conductor, an electrical connection with minimized volume resistance and at the same time a gas-tight and therefore corrosion-resistant connection can be achieved.

The interface region of the inner-conductor contact element is used for electrical contacting and mechanical connection with the inner-conductor contact element of the associated counterpart connector. In principle, it can be shaped like a pin or socket in order to contact a socket-shaped or pin-shaped inner-conductor contact element of a counterpart connector. The interface region can be stamped out of a one-piece plate-shaped metal body and formed into the respective end shape in a subsequent bending process.

The connection region of the inner-conductor contact element is that region of the one-piece inner-conductor contact element which is arranged between the crimp region and the interface region and which mechanically and electrically connects the crimp region to the interface region in one piece. In order to make the impedance profile between the crimp region and the connection region and between the connection region and the interface region as constant as possible, the cross section of the crimp region and of the interface region is preferably adapted to the cross section of the connection region in the transition between the crimp region and the connection region and between the connection region and the interface region.

The elongate partial regions of the angular connection region preferably merge into one another in the form of a curve or an arc. A continuous longitudinal profile with a constant cross section from the crimp region over the connection region to the interface region is thus realized, which permits a constant impedance profile from the crimp region over the longitudinal extent of the connection region as far as the interface region.

The one-piece inner-conductor contact element can be produced from a plate-shaped metal body, i.e. from a metal sheet, in a first production step by means of a forming process, preferably a stamping process. For the inner-conductor contact element, a metallic material with a good mechanical workability, for example brass, copper beryllium or the like, is preferred. With regard to good electrical contactability, the metallic base material of the inner-conductor contact element is preferably additionally coated with a coating material having good electrical conductivity, for example gold, silver or the like.

Advantageous embodiments and developments are set forth in the description, with reference to the figures of the drawing.

It will be appreciated that the aforementioned features and the features still to be explained below can be used not only in the respectively cited combination but also in other combinations or singly, without departing from the scope of the present invention.

In a preferred embodiment of the inner-conductor contact element, the longitudinal extent of the interface region and the longitudinal extent of the crimp region are oriented orthogonally to each other. This is realized by an angularly shaped connection region, of which the elongate partial regions are oriented at an angle of 90° to one another.

In a preferred further embodiment of the inner-conductor contact element, the connection region is in the shape of a band. The band-shaped connection region has an angular formation in a plane defined by the longitudinal extent and by the greater transverse extent, i.e. the first transverse extent, of the band-shaped connection region. In this way, an inner-conductor contact element for an angled connector can be produced, with little ef-fort, from a metal plate using a stamping and bending process.

In a preferred further embodiment of the inner-conductor contact element, the angular shape of the connection region is designed to be only planar. A planar formation, i.e. a plate-like configuration, of a three-dimensional body is characterized by a main extent of the body in a single plane. A planar or plate-like configuration has no curvature, no bending, no buckling, or the like. The angular configuration of the connection region can thus be formed solely in a plane which is formed by the longitudinal extent and the greater transverse extent, i.e. the first transverse extent, of the connection region. Thus, the connection region of the inner-conductor contact element can be realized solely by a stamping process. In this case, the bending steps can be limited solely to the shaping of the interface region and of the crimp region.

By contrast, in the case of an angular shape of the connection region in a plane formed in the connection region by its longitudinal extent and its smaller transverse extent, i.e. the second transverse extent, there is no plate-like formation and no planar structure, but rather a curved structure. With such an angular formation of the connection region, a bending process is required in addition to the stamping process.

Since the manufacturing accuracy associated with stamping is better by a factor of about three to five compared to bending in accordance with the current state of technology, a higher precision of the inner-conductor contact element, and thus also a more precise arrangement and shaping to the outer-conductor contact element of the coaxial angled connector, can be realized with a single planar design of the angled connection region. The impedance profile in the critical connection region of the inner-conductor contact element can thus be additionally optimized.

Also, if the connection region of the inner-conductor contact element is produced in a way that is limited solely to a stamping process, it is possible to avoid formation of cracks, which typically occurs during the bending process, and subsequent bending back, which may in some cases occur as a result of relaxation If the outer-conductor contact element is adapted to the inner-conductor contact element with regard to optimized impedance matching, a large region of the E-field is oriented parallel along the longitudinal extent of the connection region in the case of a single planar design of the angular connection region. By contrast, with a curved configuration of the angular connection region, only a small region of the E-field is oriented parallel along the longitudinal extent of the connection region. Thus, a solely planar design of the angular connection region also brings about an improvement in the impedance matching along the longitudinal extent of the connection region.

However, in addition to a planar design of the connection region in a plane formed by the longitudinal extent and the greater transverse extent of the connection region, a non-planar design of the connection region is also conceivable within the scope of the invention. A for example U-shaped or cylindrical cross-sectional profile of the connection region, for example, can be realized by an additional bending process.

The crimp region of the inner-conductor contact element preferably has a bearing region and at least one crimp wing. The bearing region is that region of the crimp region or of the crimp sleeve that rests on the anvil belonging to the crimping tool. The profile of the bearing region thus corresponds to the inner profile of the anvil and typically has a planar or approximately planar profile.

Each individual crimp wing of the crimp region or of the crimp sleeve is attached to the bearing region. The attachment between the individual crimp wing and the bearing region takes place on the side of the bearing region, i.e. in each case at a lateral end of the bearing region, over a longitudinal extent of the bearing region.

With the punch of the crimping tool, each individual crimp wing is bent during the crimping process in such a way that the bearing region and the at least one crimp wing together encase the strands of the cable inner conductor in a gas-tight manner and press them, and thus a secure mechanical and electrical connection is produced between the cable inner conductor and the inner-conductor contact element.

The bearing region of the crimp region is preferably oriented orthogonally to the connection region, i.e. the surface vector of the planar bearing region of the crimp region is oriented perpendicular to the surface vector of the planar connection region. In this way, a crimp region is formed which enables symmetrical insertion and positioning of the inner-conductor contact element in the insulator element of the angled connector for each crimp sleeve profile used. This symmetrical orientation of the crimp region advantageously pre-vents tilting of the inner-conductor contact element in the insulator element and thus prevents an asymmetrical end position of the inner-conductor contact element in the insulator element. This technical measure also improves impedance matching within the coaxial angled connector.

Alternatively, the bearing region of the crimp region can be oriented in the same direction as the connection region, i.e. the surface vector of the planar bearing region of the crimp region and the surface vector of the planar connection region have the same orientation. Any other technically feasible orientation between the bearing region of the crimp region and the connection region is also conceivable.

In a preferred embodiment, the crimp region is to be connected to the connection region via its bearing region, and at the same time the bearing region is to be oriented orthogonally to the connection region. For this purpose, the bearing region preferably has an axial continuation which is laterally attached to the connection region, i.e. at a lateral end of the connection region. Preferably, the axial continuation of the bearing region is laterally attached only to an axial end region of the connection region, in order to make the attachment between connection region and crimp region as short as possible. In order to orient the bearing region of the crimp region orthogonally to the connection region, the axial continuation of the bearing region is bent at right angles to the connection region.

The inner-conductor contact element is inserted into the insulator element of the angled connector with the aid of a joining or pressing tool, which exerts a sufficient pressing-in pressure on the inner-conductor contact element during the joining process. In particular, the pressing tool exerts a symmetrical pressing-in pressure on the inner-conductor contact element in order to insert the inner-conductor contact element symmetrically, i.e. without tilting with respect to the joining direction, into the recesses of the insulator element. For this purpose, symmetrical bearing surfaces for the pressing tool are to be formed on the inner-conductor contact element that is to be joined. On account of the angled geometry of the inner-conductor contact element, symmetrical bearing surfaces for the pressing tool are to be provided in each of the two leg-shaped portions of the inner-conductor contact element:

In order to realize symmetrical bearing surfaces for a pressing tool in the leg-shaped portion of the inner-conductor contact element, which contains the crimp region, a flange-shaped region is attached at right angles laterally to the axial continuation of the bearing region belonging to the crimp sleeve. The inner-conductor contact element has a U-shaped cross-sectional profile, over the longitudinal extent of the axial continuation of the bearing region belonging to the crimp sleeve, together with the laterally attached flange-shaped region and the likewise laterally attached connection region. The end faces of the flange-shaped region and of the connection region together form symmetrical bearing surfaces for a pressing tool.

The interface region is preferably designed in the shape of a socket in its longitudinal extent. The socket shape of the interface region is realized by bending subsequent to the stamping process. In the leg-shaped portion of the inner-conductor contact element, which contains the interface region, the end face of the socket-shaped interface region adjoining the connection region forms a symmetrical bearing surface for a pressing tool.

With the symmetrical bearing surfaces on the crimp side and on the interface side, a symmetrical insertion and positioning of the inner-conductor contact element in the insulator element is guaranteed by a correspondingly shaped pressing tool.

In addition to the symmetrical positioning of the inner-conductor contact element in the insulator element, a further technical requirement to strive for is the secure fixing of the inner-conductor contact element in the insulator element.

For this purpose, in the interface region, the outer diameter is tapered as a first realization of a technical fixing measure. The tapering is preferably conical, but it can also be realized as a concave or convex curve. The tapering is preferably formed in a partial section of the longitudinal extent. However, tapering over the entire longitudinal extent is also conceivable, or several tapers in individual portions of the longitudinal extent of the interface region. The inner diameter of the insulator element also has a tapering, preferably a tapering with the same taper profile as the tapering in the inner-conductor contact element. Thus, during the joining process, the inner-conductor contact element is supported with the tapering on the tapering of the insulator element and is thus blocked in its axial freedom of movement in the joining direction. The tapering of the inner-conductor contact element thus interacts with the tapering of the insulator element as a “forward stop”.

In a further embodiment of a technical fixing measure, a radially elastic latching means is provided on the outer surface of the interface region, which latches into a corresponding counterpart latching means of the insulator element during the joining process of the in-ner-conductor contact element. A latching lug, a latching hook, a spring arm, a snap-in hook or the like can serve as the latching means. A latching recess, a snap-in receptacle or the like can thus serve as the corresponding counterpart latching means. The latching means typically has a stop surface which is directed counter to the joining direction and is supported on an inner wall of the counterpart latching means in the latched state. The inner-conductor contact element is thus blocked in its axial freedom of movement counter to the joining direction when the latching means and the counterpart latching means are in the latched state. The latching means formed on the inner-conductor contact element thus interacts with the counterpart latching means of the insulator element as a “reverse stop”.

A combination of tapering and latching means is preferably formed on the inner-conductor contact element in order to achieve a form-fitting fixation of the inner-conductor contact element within the insulator element and thus a fixation in both axial directions. With the two technical measures of tapering and of latching means implemented in the interface region, the inner-conductor contact element is fixed in place in the leg-shaped portion of the angled connector that belongs to the interface region.

To fix the inner-conductor contact element in the leg-shaped portion of the angled connector belonging to the crimp region, at least one web-shaped portion is formed on an inner wall of the insulator element, which web-shaped portion is directed radially inward and extends in the direction of the longitudinal extent of the interface region of the inner-conductor contact element, i.e. extends in the joining direction of the inner-conductor contact element. During the joining process of the inner-conductor contact element, this at least one web-shaped portion of the insulator element is pressed with an outwardly directed wall in the connection region of the inner-conductor contact element. This results in a force-fit connection between the inner-conductor contact element and the insulator element. The force-fit connection between the inner-conductor contact element and the insulator element is preferably realized in a leg-shaped portion of the angled connector belonging to the crimp region of the inner-conductor contact element, i.e. in a portion of the connection region of the inner-conductor contact element adjoining the crimp region. The web-shaped portion on the inner wall of the insulator element can also be referred to as a compression rib, on account of its compression with the inner-conductor contact element.

Two web-shaped portions are preferably formed in the inner wall of the insulator element, which web-shaped portions are arranged opposite each other and are each connected by force-fit engagement to the connection region or the opposite flange-shaped region of the inner-conductor contact element In this way, a symmetrical fixing and orientation of the inner-conductor contact element is realized in the leg-shaped portion of the angled connector belonging to the crimp region. In addition to the formation of a single web-shaped portion or of a single pair of web-shaped portions formed opposite each another, it is also possible to provide a plurality of web-shaped portions or a plurality of pairs of web-shaped portions in order to improve the force-fit fixing.

Finally, in a further embodiment of fixing the inner-conductor contact element within the angled connector in the connection region of the inner-conductor contact element, at least one recess and/or at least one elevation is formed in such a way that it can be latched onto a complementary elevation or recess in an insulator element belonging to the angled connector. Such a recess or such an elevation can be produced, for example, in an em-bossing process that follows the stamping process. The individual recess or the individual elevation is formed in each case in such a way that it enables the inner-conductor contact element to be fixed, preferably fixed in a manner secure against rotation, in the insulator element.

Such a recess or such an elevation can have, for example, a triangular, quadrangular or polygonal cross-sectional profile. Angular or multi-limb cross-sectional profiles are also conceivable. Tilting of the inner-conductor contact element within the insulator element of the angled connector about an axis of rotation, which is oriented perpendicularly with respect to the plane of the two leg-shaped portions of the angled connector, can thus advantageously be prevented.

In order to optimize the impedance profile within the longitudinal extent of the angled connector, i.e. to have the fewest possible changes or the smallest possible changes in the impedance profile, that portion of the angled connector in which the angular connection region of the inner-conductor contact element is positioned must be improved as regards the impedance profile.

In order to improve the essentially planar angled connection region of the inner-conductor contact element in terms of its influence on the impedance profile of the angled connector, a further angular region is attached to the angular connection region, preferably via a connection web.

The further angular region preferably corresponds to the angular connection region and is preferably oriented parallel to the angular connection region and arranged at a distance from it over the length of the connection web. Thus, an inner-conductor contact element is created which is formed symmetrically with respect to the longitudinal axis of the angled connector in the connection region between the crimp region and the interface region. In this way, a “quasi-coaxiality” is realized between an inner-conductor contact element, designed symmetrically in this way, and an outer-conductor contact element, also designed symmetrically in this longitudinal portion. The further angularly shaped region of the inner-conductor contact element and the connection web to the angularly shaped connection region can be punched out together with the other regions of the inner-conductor contact element and then bent into the respective orientation.

In order preferably to improve the impedance profile of the angled connector in the longitudinal portion of the substantially planar and angular connection region of the inner-conductor contact element, an asymmetrical constriction is formed in an inner wall of the insulator element, which constriction preferably extends as far as the connection region. This asymmetrical constriction of the insulator element is formed in the direction of the longitudinal axis of the insulator element in such a way that the inner-conductor contact element, with its interface region and its crimp region plus the axial continuation of the bearing region belonging to the crimp region, can be inserted into the insulator element laterally at the asymmetrical constriction of the insulator element. The asymmetry of the planar connection region of the inner-conductor contact element in this longitudinal portion of the angled connector is thus compensated by the asymmetry of the insulator element with regard to improved impedance matching.

An angled connector is also covered by the invention. The angled connector has the inner-conductor contact element according to the invention.

The angled connector preferably also has an insulator element with a sleeve-shaped portion for receiving the interface region of the inner-conductor contact element. The insulator element preferably also has a trough-shaped portion for receiving the crimp region and the connection region of the inner-conductor contact element. The trough-shaped portion of the insulator element can extend as far as the sleeve-shaped portion.

The trough-shaped portion of the insulator element makes it possible for the inner-conductor contact element to be able to be inserted into the insulator element with its crimp region and its connection region in the direction of the longitudinal extent of the interface region. While the interface region of the inner-conductor contact element is coaxially surrounded by the sleeve-shaped portion of the insulator element, the crimp region and the connection region of the inner-conductor contact element are surrounded by the trough-shaped portion of the insulator element approximately only in three mutually orthogonal directions.

In a further embodiment, the sleeve-shaped portion of the insulator element can additionally be slotted along its longitudinal extent. By virtue of the slotting, the interface region of the inner-conductor contact element can be laterally inserted, in particular clicked, into the insulator element.

Features that have already been described in conjunction with the inner-conductor contact element according to the invention can of course also be advantageously applied to the angled connector according to the invention, and vice versa.

Finally, the invention also covers a method for producing the inner-conductor contact element according to the invention. The method according to the invention for producing an inner-conductor contact element comprises the method steps of: stamping an inner-conductor contact element which has a crimp region, an interface region and a connection region connecting the crimp region to the interface region, and bending the interface region and the crimp region.

The connection region of the inner-conductor contact element according to the invention has a first transverse extent and a second transverse extent which is greater than the first transverse extent. The connection region has an angular shape in a plane formed by the first transverse extent and a longitudinal extent of the connection region. The design of the connection region can in particular be accordingly predefined by the stamping process.

The above embodiments and developments can be combined with one another in any desired manner, insofar as is feasible. Further possible embodiments, developments and implementations of the invention also encompass combinations, not explicitly mentioned, of features of the invention that are described above or below with regard to the exemplary embodiments. In particular, a person skilled in the art will also add individual aspects as improvements or supplementations to the respective basic form of the present invention.

CONTENTS OF THE DRAWING

Figure 1B:
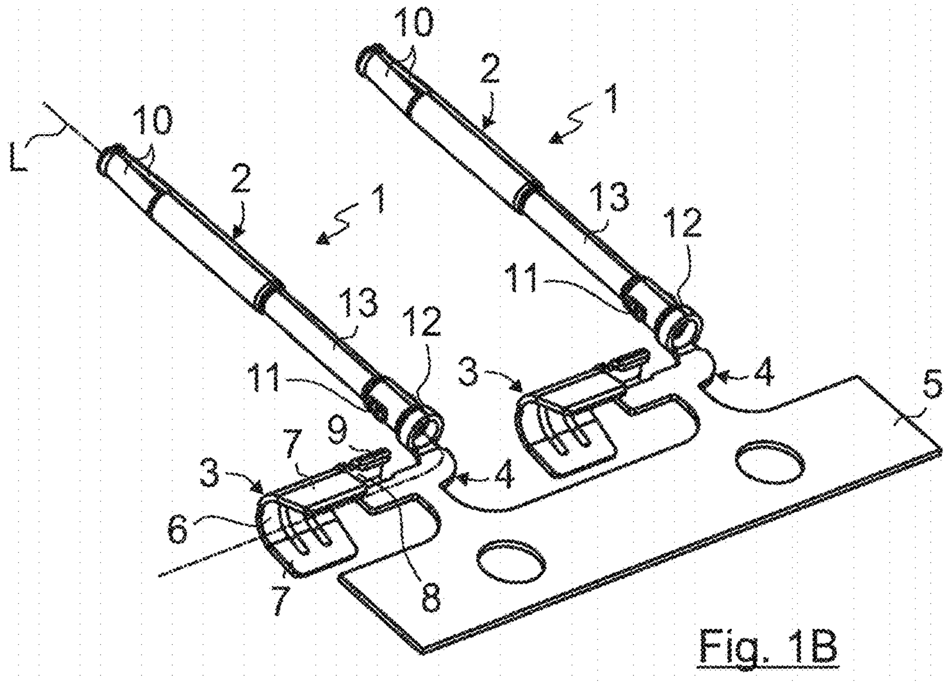
Figure 1C:
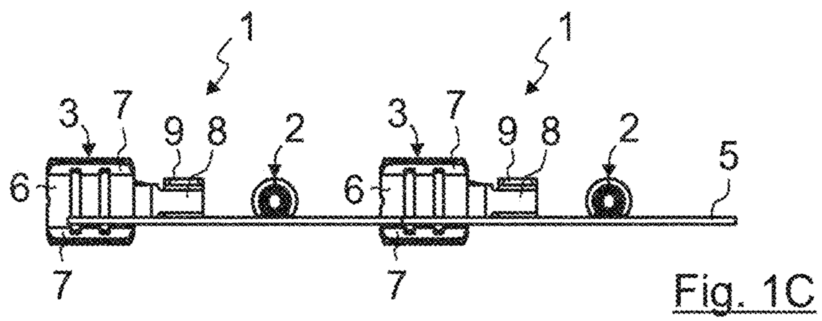
Figure 1D:
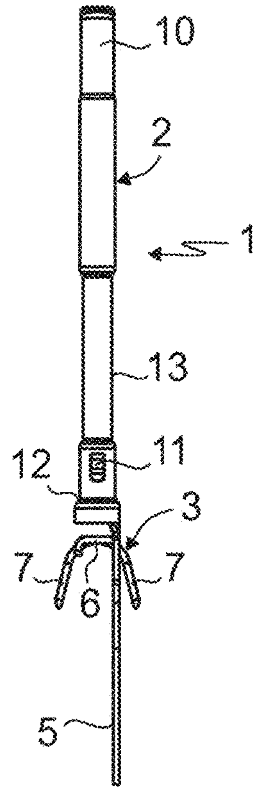
Figure 1E:
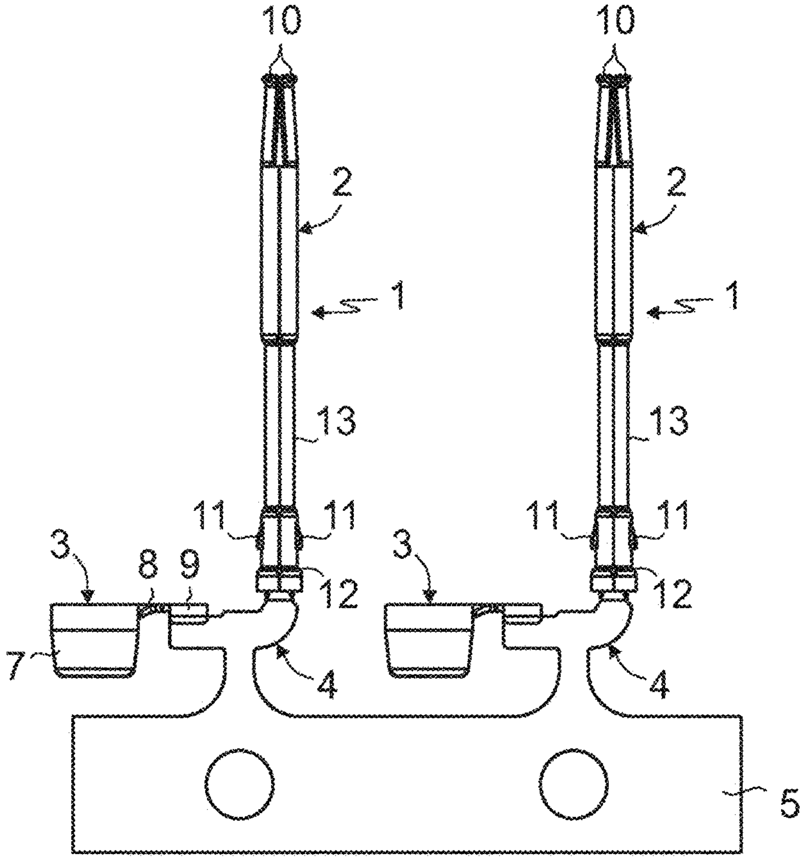
Figure 2A:
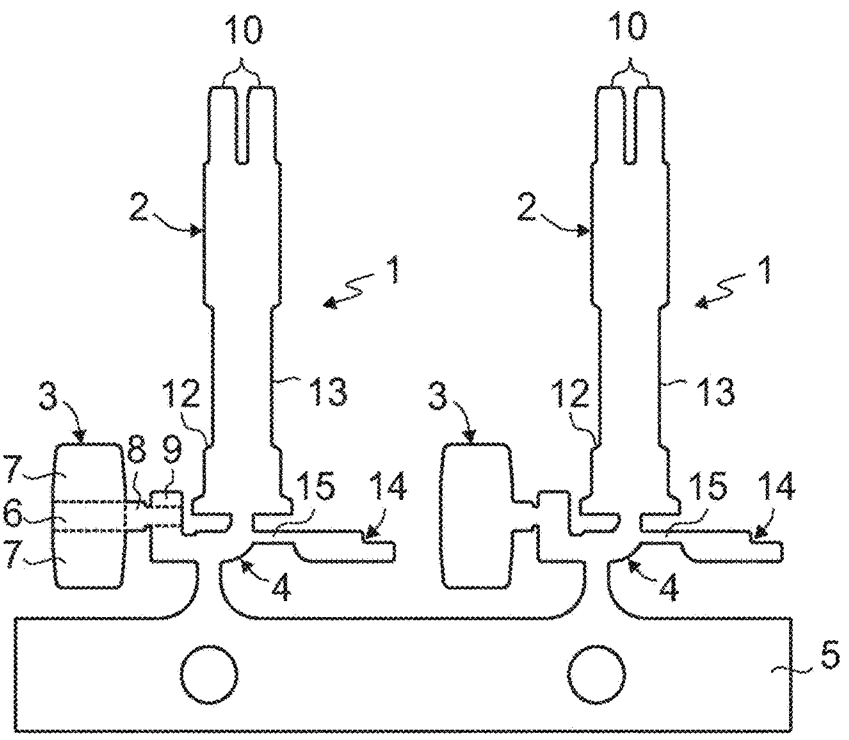
Figure 2B:
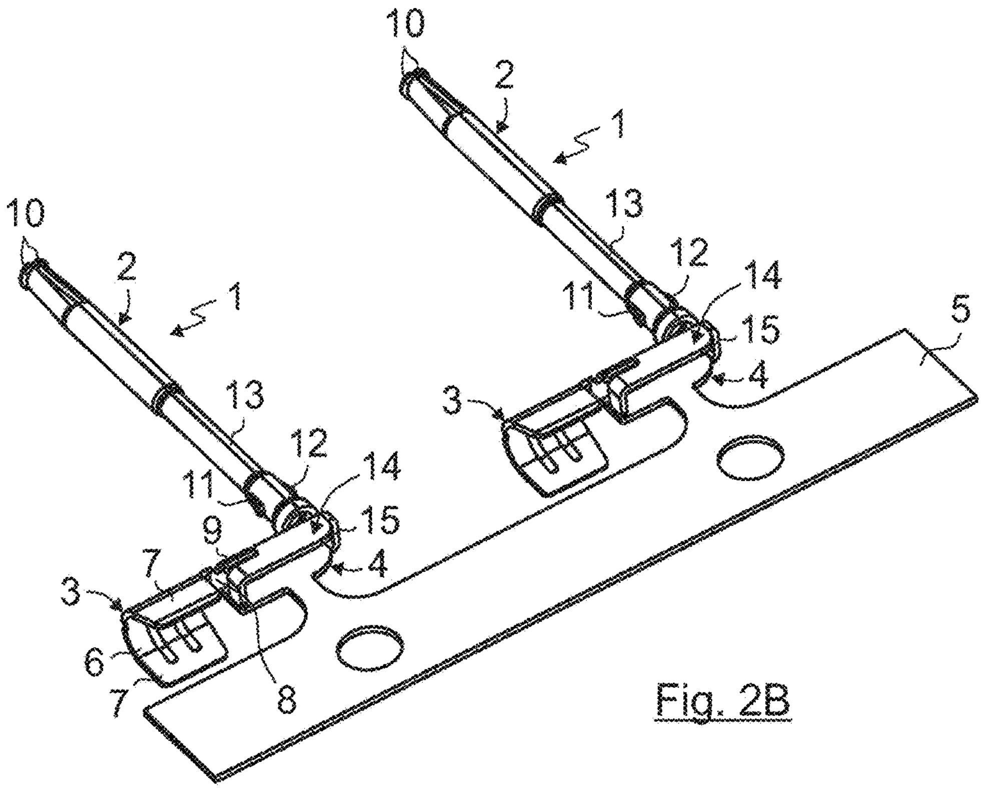
Figure 2C:
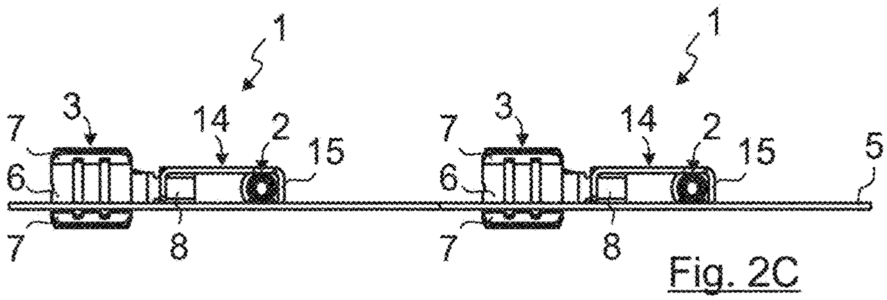
Figure 2D:
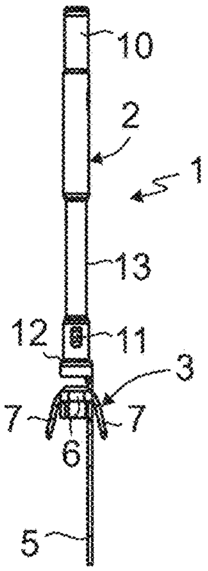
Figure 2E:
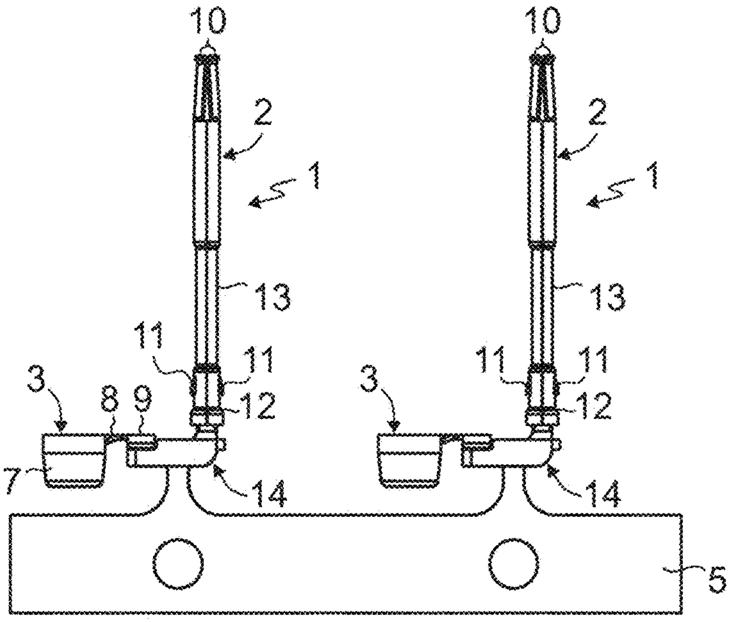
Figure 3:
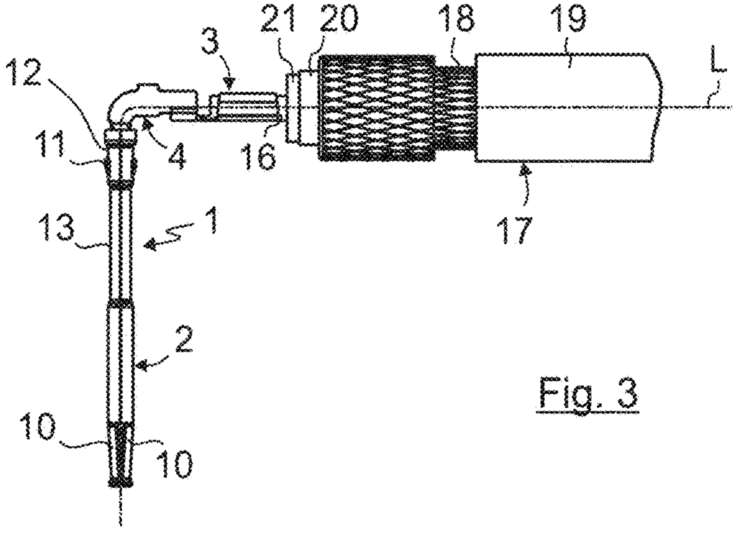
Figure 4A:
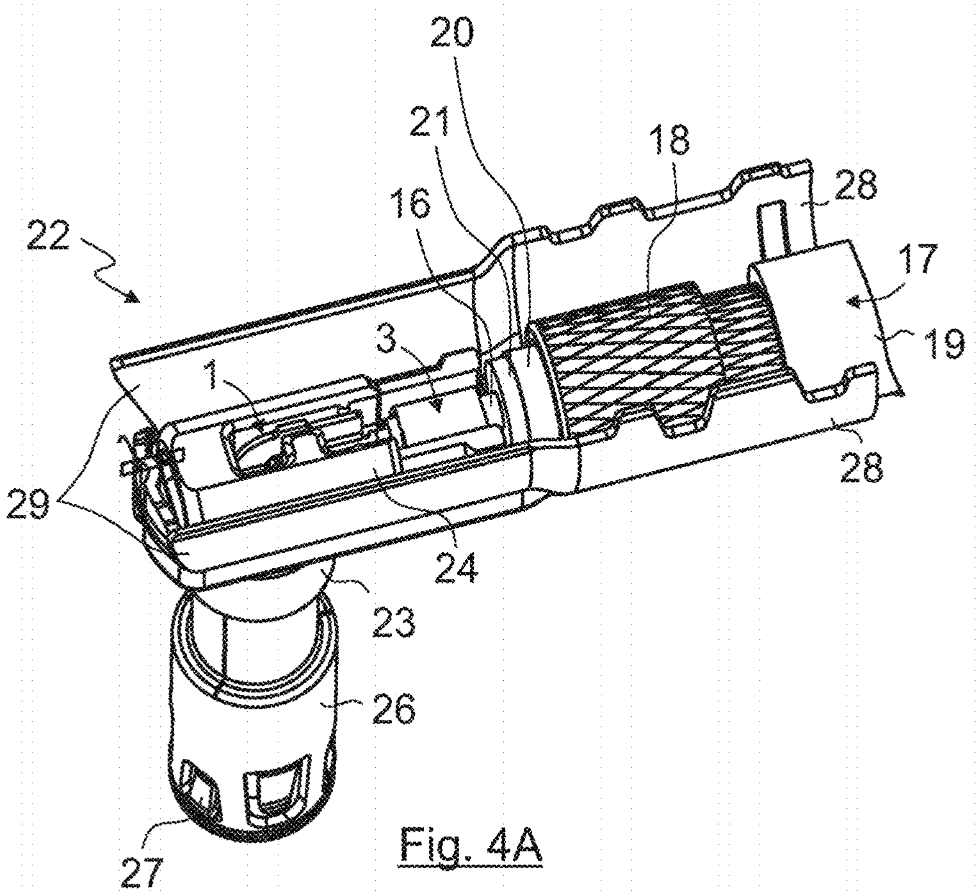
Figure 4B:
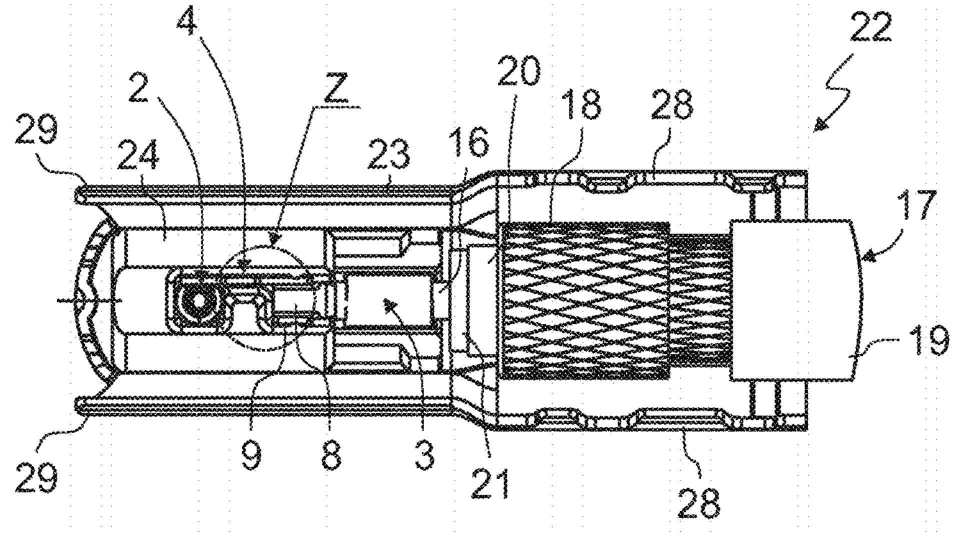
Figure 4C:
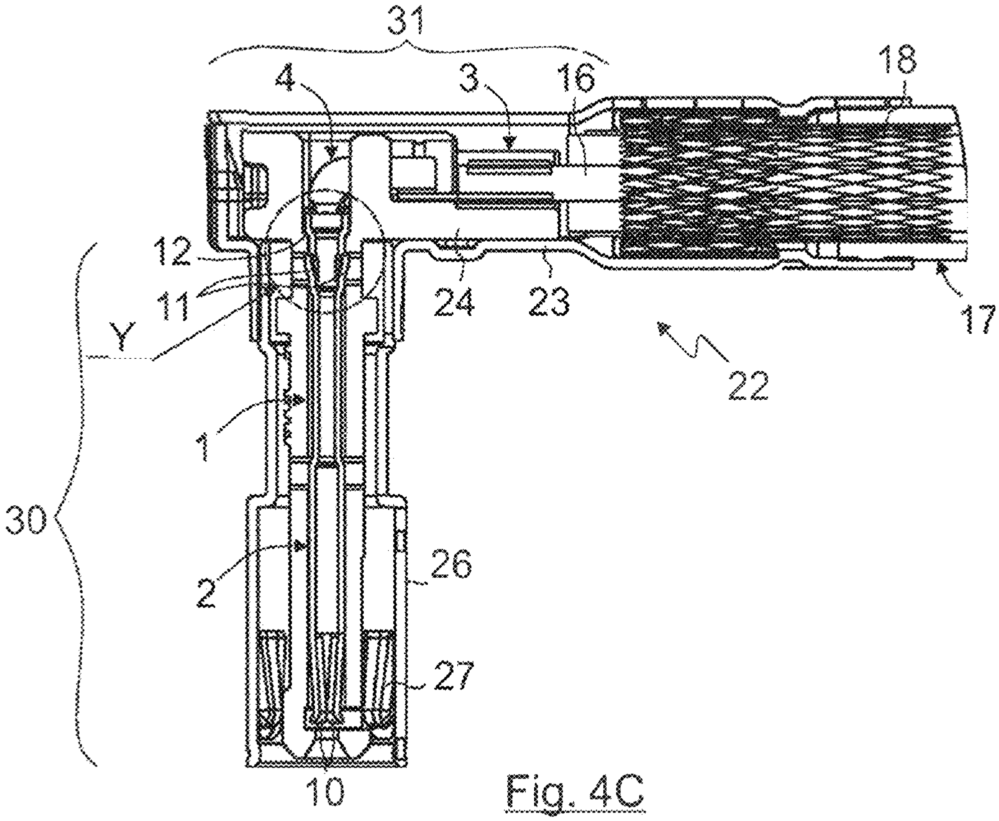
Figure 4D:
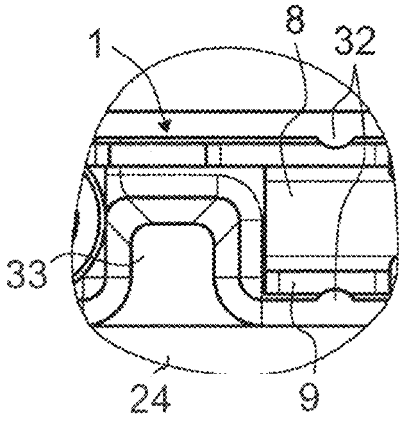
Figure 4E:
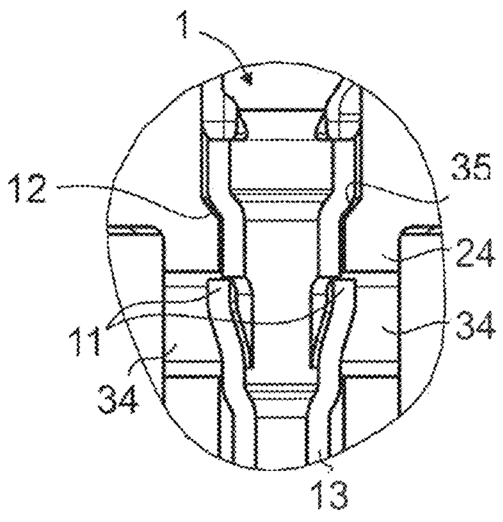

The present invention is explained in more detail below with reference to the exemplary embodiments shown in the schematic figures of the drawing. In the drawing:

FIG. 1A shows a plan view of an inner-conductor contact element after the stamping, FIG. 1B shows an isometric representation of a finished inner-conductor contact element, FIGS. 1C, 1D, 1E show a side view of a finished inner-conductor contact element, FIG. 2A shows a plan view of a widening of an inner-conductor contact element after the stamping, FIG. 2B shows an isometric representation of a widening of a finished inner-conductor contact element, FIGS. 2C, 2D, 2E show a side view of a widening of a finished inner-conductor contact element, FIG. 3 shows a side view of a cable assembled with the inner-conductor contact element, FIG. 4A shows an isometric representation of a cable pre-assembled with the angled connector, FIGS. 4B, 4C show sectional representations of a cable pre-assembled with the angled connector, and FIGS. 4D, 4E show details of the angled connector.

The accompanying figures of the drawing are intended to convey a better understanding of the embodiments of the invention. They illustrate embodiments and, in connection with the description, serve to explain the principles and concepts of the invention. Other embodiments and many of the advantages mentioned will become clear from the drawings. The elements in the drawings are not necessarily shown in a manner true to scale in relation to one another.

In the figures of the drawing, identical, functionally identical and identically acting elements, features and components are each provided with the same reference signs, un-less stated otherwise.

The figures are described in an interrelated and comprehensive manner below.

DESCRIPTION OF EXEMPLARY EMBODIMENTS

A basic exemplary embodiment of an inner-conductor contact element 1 can be seen from FIGS. 1A to 1E.

The inner-conductor contact element 1 has an interface region 2, a crimp region 3 and an angularly shaped connection region 4, which connects the crimp region 3 to the interface region 2 in the longitudinal extent L (cf. FIG. 1B) of the inner-conductor contact element 1.

As can be seen from FIGS. 1A, 1B and 1E, the angular connection region 4 of the individual inner-conductor contact elements 1 is each connected laterally to a carrier strip before the method step of separation. FIG. 1A shows the individual inner-conductor contact elements 1, which are still of planar design, after the stamping process, while FIG. 1B depicts the individual stamped and bent inner-conductor contact elements 1 after the stamping and bending process. It will be seen from FIGS. 1A and 1B together that the connection region 4 obtains its angular shape solely through the stamping process.

In the embodiment shown in FIGS. 1A to 1E, the crimp region 3 has a bearing region 6 and two laterally attached crimp wings 7. However, the attachment of a single crimp wing 7 to the bearing region 6 is also conceivable. The crimp wings 7 of the crimp region 3 are bent relative to the bearing region 6 in the phase between the bending process and the assembly process with the cable, as can be seen from FIGS. 1B to 1E.

The bearing region 6 of the crimp region 3 has, in the direction of the connection region 4, an axial continuation 8 which is attached laterally to the connection region 4. The lateral attachment of the axial continuation 8 to the connection region 4 is preferably carried out within an axial end portion of the connection region 4.

For the symmetrical positioning of the inner-conductor contact element 1 in the angled connector 22 (cf. FIGS. 4A to 4E), the bearing region 6 of the crimp region 3 is preferably oriented at right angles to the connection region 4, i.e. the surface vector of the planar bearing region 6 is oriented at right angles to the surface vector of the planar connection region 4. Thus, the axial continuation 8 of the bearing region 6 is preferably attached to the side of the connection region 4 at a right angle.

So that the pressing tool, with which the inner-conductor contact element 1 is inserted into an insulator element 24 of the angled connector 22, can be given a symmetrical bearing surface for the symmetrical positioning of the inner-conductor contact element 1 in the angled connector 22, a flange region 9 is attached to the side of the axial continuation 8 of the bearing region 6 opposite the connection region 4. The surface vector of the planar flange region 9 is oriented, equivalent to the connection region 4, at a right angle to the surface vector of the axial continuation 8 of the bearing region 6. The two end faces of the flange region 9 and of the connection region 4 are thus directed in the same direction as the surface vector of the axial continuation 8 of the bearing region 6 belonging to the crimp region 3. Thus, these two end faces offer mutually symmetrical bearing surfaces fora pressing tool, in order to insert the inner-conductor contact element 1 in the joining direction, i.e. in the direction of the longitudinal extent L of the interface region 2, into the angled connector 22 without tilting.

The interface region 2 of the inner-conductor contact element 1 is preferably formed in the shape of a socket. The interface region 2 is used to bring the inner-conductor contact element 1 into contact with a corresponding inner-conductor contact element of a counterpart connector. For this purpose, several spring tabs 10 are preferably formed at the axial end of the interface region 2.

The annular end face of the interface region 2 in the transition to the connection region 4 represents a further bearing surface for a pressing tool in order to insert the inner-conductor contact element 1 in the joining direction, i.e. in the direction of the longitudinal extent of the interface region 2, into the angled connector 22 without tilting.

For the axial fixation of the inner-conductor contact element 1 in the angled connector 22, at least one latching means 11 (see, for example, FIG. 1B), preferably two latching means 11 arranged opposite each other on the outer surface, is/are formed on the outer surface of the interface region 2. The latching means 11 is preferably designed as an elastic latching tab, as is shown in FIGS. 1B, 1D and 1E. Each of these latching means 11 latches with a counterpart latching means formed in the insulator element 24 in the same axial and rotational position. In the case of an elastic latching tab, the counterpart latching means is preferably designed as a latching recess. As can be seen in particular from FIG. 1E, the elastic latching tab has a supporting surface which is directed counter to the joining direction and which is supported on an inner wall of the associated latching recess in the insulator element 24. With a latching means 11 designed in this way, it is thus possible to effect blocking of the inner-conductor contact element 1 in the angled connector 22 counter to the joining direction, i.e. a "reverse stop".

A blocking of the inner-conductor contact element 1 in the angled connector 22 in the joining direction, i.e. a so-called "forward stop", is effected by a tapering 12, preferably a conical tapering 12, of the outer diameter of the inner-conductor contact element 1 in the joining direction. Such tapering of the outer diameter of the inner-conductor contact element 1 is supported, in the end position of the inner-conductor contact element 1, on a tapering formed at the same axial position in the insulator element 24.

One or more longitudinal portions 13 of the interface region 2, each with a changed outer diameter—in FIGS. 1A, 1B, 1D and 1E with a reduced outer diameter in each case—compared to the remaining longitudinal portions, are used, in corresponding longitudinal portions of an outer conductor contact element 23 (cf. FIGS. 4A to 4E) each with a changed inner diameter, for the impedance matching in the interface region 2.

In a continuation of the inner-conductor contact element 1 according to FIGS. 2A to 2E, a further angular region 14 is formed parallel to the angular connection region 4. The angular shape of the further region 14 preferably corresponds in terms of shape and size to the angular connection region 4. The further angular region 14 is connected to the angular connection region 4 via a connection web 15 and is spaced apart by the connection web 15 from the angular connection region 4 and arranged parallel thereto.

In the transition region of the angled connector 22 between the interface region 2 and the crimp region 3 of the inner-conductor contact element 1, the combination of the further angular region 14 and the angular connection region 4 forms, together with the outer-conductor contact element 23 of the angled connector 22, which typically has a rectan-gular or round cross-sectional profile. an approximation to a coaxial or "quasi-coaxial" structure. In this way, the impedance profile along the longitudinal extent of the angled connector 22 is additionally improved.

The representation in FIG. 3 shows a finished stamped and bent inner-conductor contact element 1, the crimp region 3 of which is crimped to the inner conductor 16 of a coaxial cable 17. The coaxial cable 17 is pre-assembled with the inner-conductor contact element 1 before the crimping process. For this purpose, the outer conductor shield 18, as shown in FIG. 3, is exposed from the cable jacket 19 and folded back about a supporting sleeve. Equivalently, a metal foil 20 is exposed from outer conductor shield 18, an insulator 21 is exposed from the metal foil 20, and the inner-conductor 16 is exposed from the insulator 21.

An angled connector 22 and details of the angled connector 22 can be seen from FIGS. 4A to 4E:

The angled connector 22 has an outer-conductor contact element 23, an insulator element 24, which in the assembled state with the coaxial cable 17 according to FIGS. 4B and 4C is surrounded by the outer-conductor contact element 23, and the inner-conductor contact element 1 arranged within the insulator element 24.

In the final assembled state according to FIGS. 4B and 40, the outer-conductor contact element 23 has an angular longitudinal profile and a substantially sleeve-shaped cross-sectional profile. To adapt to different outer conductor profiles of the counterpart connector, an outer-conductor interface sleeve 26 can be fastened to that axial end of the outer-conductor contact element 23 at which the interface to the counterpart connector is located. Contact springs 27 for reliable contacting of the outer conductor of the counterpart connector are preferably formed on the outer-conductor contact element 23 or on the outer-conductor interface sleeve 26 in the region of the interface to the counterpart connector.

In a pre-assembled state according to FIG. 4A, the portion of the outer-conductor contact element 23 in which the interface to the coaxial cable 17 is located is trough-shaped, in order to allow the insulation element 24 and the inner-conductor contact element 1 to be inserted. In a final assembly step, outer-conductor crimp wings 28 attached laterally to the trough-shaped portion of the outer-conductor contact element 23, and closing flaps 29 adjoining them in the direction of the longitudinal axis, are closed by means of a pressing or crimping tool. Here, the outer-conductor crimp wings 28 are crimped to the outer conductor shield 18 of the coaxial cable.

The insulator element 24 of the angled connector 22 also has an angular longitudinal profile. The insulator element 24 has a longitudinal portion 30 (see FIG. 4C) with a sleeve-shaped cross-sectional profile, in which the preferably socket-shaped interface region 2 of the inner-conductor contact element 1 is received, and a trough-shaped portion 31 (see FIG. 4C), in which the crimp region 3 and the connection region 4 of the inner-conductor contact element 1 are received. The trough-shaped configuration of the trough-shaped portion 31 of the insulator element 24 allows the inner-conductor contact element 1 to be easily inserted into the insulator element 24.

FIG. 4D, which shows an enlarged detail Z from FIG. 4B, illustrates the formation of a web-shaped portion 32, preferably of two web-shaped portions 32 which are each formed on the inner wall of the insulator element 24. The web-shaped portion 32 is directed radially inward, runs in the joining direction of the inner-conductor contact element 1 and is preferably formed in a region of the trough-shaped portion 31 of the insulator element 24, in which the flange-shaped region 9 and the oppositely arranged connection region 4 of the inner-conductor contact element 1 come to lie. By inserting the inner-conductor contact element 1 into the insulator element 24 using a pressing tool, the web-shaped portions 32 of the insulator element 24 are squeezed by the connection region 1 or the flange-shaped region 9 of the inner-conductor contact element 1 and thus connected to each other in a force-fitting manner.

FIG. 4D also shows an asymmetrical constriction 33 formed on the insulator element 24, which asymmetrical constriction 33, on the inner wall of the insulator element 24, is directed in the direction of the planar connection region 4. In this way, the negative influence of the connection region 4 of the inner-conductor contact element 1 on the imped-ante profile, which is arranged asymmetrically to the longitudinal axis of the angled connector, can advantageously be compensated for by a corresponding asymmetrical design of the insulator element 24. To enable the inner-conductor contact element 1 to be inserted into the insulator element 24, the asymmetrical constriction 33 of the insulator element 24 is formed between the positioning of the axial continuation 8 of the bearing region 6, belonging to the crimp region 3, and the joining channel of the interface region 2.

FIG. 4E, which shows an enlarged detail Y from FIG. 4C, illustrates the interaction between the latching means 11, formed in the interface region 2 of the inner-conductor contact element 1, and the counterpart latching means 34, formed in the insulator element 24. The latching means 11 is implemented here, for example, as an elastic latching tab, and the counterpart latching means as an associated latching recess. FIG. 4E also shows a conical tapering 12 of the outer diameter of the interface region 2, which tapering is supported on a likewise conical tapering 35 of the insulator element 24.

Although the present invention has been fully described above on the basis of preferred exemplary embodiments, it is not restricted to these and instead can be modified in a variety of ways.

The invention claimed is:

1. An inner-conductor contact element for an angled connector, the inner-conductor contact element comprising:
- a crimp region connectable to an inner conductor of a cable,
- an interface region connectable to an inner-conductor contact element of a counterpart connector corresponding to the angled connector, and
- a connection region which connects the crimp region to the interface region, wherein the inner-conductor contact element is formed in one piece,
wherein the connection region has a first transverse extent and a second transverse extent which is smaller than the first transverse extent,
wherein the connection region has an angular shape in a plane formed by the first transverse extent of the connection region and a longitudinal extent of the connection region,
wherein the crimp region has a bearing region and at least one crimp wing which is attached to the bearing region over a longitudinal extent of the bearing region at a lateral end of the bearing region,
wherein an axial end region of the connection region is attached laterally to an axial continuation of the bearing region, and
wherein a flange-shaped region is attached laterally to the axial continuation of the bearing region, in such a way that the axial continuation of the bearing region forms a U-shaped cross-sectional profile with the flange-shaped region and with the connection region.

2. The inner-conductor contact element as claimed in claim 1, wherein a longitudinal extent of the interface region and a longitudinal extent of the crimp region are oriented orthogonally to each other.

3. The inner-conductor contact element as claimed in claim 1, wherein the connection region is band-shaped.

4. The inner-conductor contact element as claimed in claim 1, wherein the connection region is planar in the plane formed by the first transverse extent of the connection region and the longitudinal extent of the connection region.

5. The inner-conductor contact element as claimed in claim 1, wherein the bearing region is oriented orthogonally to or in the same direction as the connection region.

6. The inner-conductor contact element as claimed in claim 5, wherein the axial continuation of the bearing region is oriented at a right angle to the connection region.

7. The inner-conductor contact element as claimed in claim 1, wherein the interface region has a shape of a socket in the longitudinal extent of the interface region, and
- wherein the interface region has a longitudinal portion with a tapering of an outer diameter, for axially fixing the inner-conductor contact element in a bore of an insulator element belonging to the angled connector.

8. The inner-conductor contact element as claimed in claim 1, wherein the interface region comprises a latching means for axially fixing the inner-conductor contact element in a counterpart latching means of an insulator element belonging to the angled connector.

9. The inner-conductor contact element as claimed in claim 1, wherein the connection region comprises at least one of a recess and an elevation that is configured to latch onto a complementary profile in an insulator element belonging to the angled connector in order to fix the inner-conductor contact element in the insulator element.

10. The inner-conductor contact element as claimed in claim 1,
- comprising a further angular region attached to the connection region via a connection web, wherein the connection region and the further angular region are arranged parallel to each other and at a distance from each other.

11. An angled connector comprising:
- an inner-conductor contact element comprising
  - (i) a crimp region connectable to an inner conductor of a cable,
  - (ii) an interface region connectable to an inner-conductor contact element of a counterpart connector corresponding to the angled connector, and
  - (iii) a connection region which connects the crimp region to the interface region,
  - wherein the inner-conductor contact element is formed in one piece,
  - wherein the connection region has a first transverse extent and a second transverse extent that is smaller than the first transverse extent,
  - wherein the connection region has an angular shape in a plane formed by the first transverse extent of the connection region and a longitudinal extent of the connection region,
  - wherein the crimp region has a bearing region and at least one crimp wing which is attached to the bearing region over a longitudinal extent of the bearing region at a lateral end of the bearing region,
  - wherein an axial end region of the connection region is attached laterally to an axial continuation of the bearing region, and
  - wherein a flange-shaped region is attached laterally to the axial continuation of the bearing region, in such a way that the axial continuation of the bearing region forms a U-shaped cross-sectional profile with the flange-shaped region and with the connection region; and
- an insulator element comprising
  - (i) a sleeve-shaped portion for receiving the interface region of the inner-conductor contact element and (ii) a trough-shaped portion for receiving the crimp region and the connection region of the inner-conductor contact element, wherein the trough-shaped portion extends as far as the sleeve-shaped portion.

12. The angled connector as claimed in claim 11, wherein an inner wall of the trough-shaped portion comprises an asymmetrical constriction for impedance matching.

13. The angled connector as claimed in claim 11, wherein, to enable a force-fit connection to the connection region, at least one web-shaped portion is located in an inner wall of the trough-shaped portion and is oriented in the direction of the longitudinal axis of the interface region.

14. A method for producing an inner-conductor contact element, comprising the steps of:

stamping an inner-conductor contact element which includes a crimp region, an interface region and a connection region connecting the crimp region to the interface region, and bending the interface region and the crimp region, wherein the connection region has a first transverse extent and a second transverse extent which is smaller than the first transverse extent, wherein the connection region has an angular shape in a plane formed by the first transverse extent of the connection region and a longitudinal extent of the connection region, and wherein the crimp region has a bearing region and at least one crimp wing which is attached to the bearing region over a longitudinal extent of the bearing region at a lateral end of the bearing region, wherein an axial end region of the connection region is attached laterally to an axial continuation of the bearing region, and wherein a flange-shaped region is attached laterally to the axial continuation of the bearing region, in such a way that the axial continuation of the bearing region forms a U-shaped cross-sectional profile with the flange-shaped region and with the connection region.

* * * * *